UNITED STATES PATENT OFFICE.

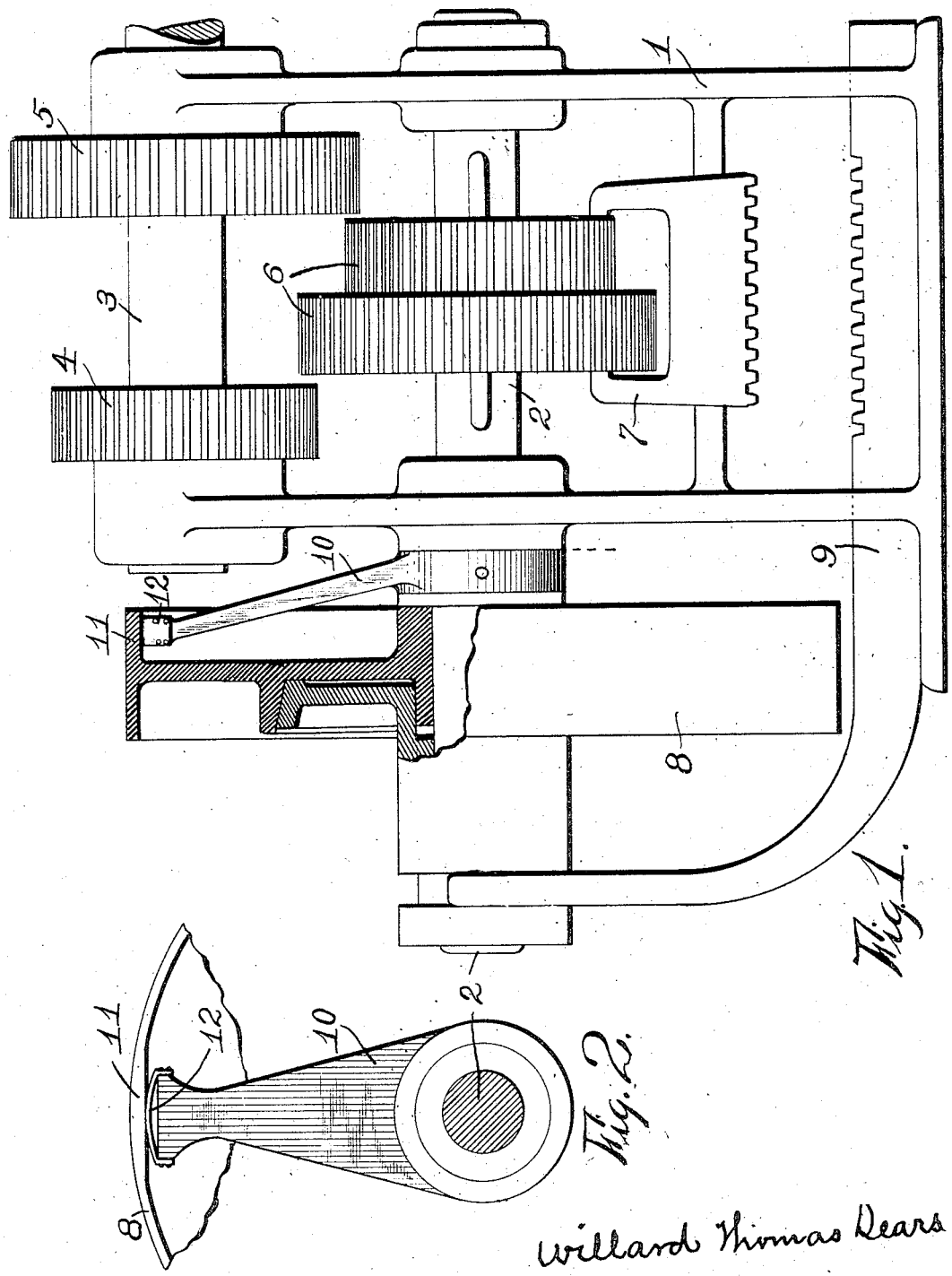

WILLARD THOMAS SEARS, OF PHILADELPHIA, PENNSYLVANIA, ASSIGNOR TO NILES-BEMENT-POND COMPANY, OF JERSEY CITY, NEW JERSEY.

POWER-TRANSMISSION DEVICE.

No. 844,415.     Specification of Letters Patent.     Patented Feb. 19, 1907.

Application filed October 4, 1906. Serial No. 337,342.

*To all whom it may concern:*

Be it known that I, WILLARD THOMAS SEARS, a citizen of the United States, residing at Philadelphia, Philadelphia county, Pennsylvania, have invented certain new and useful Improvements in Power-Transmission Devices, of which the following is a specification.

This invention pertains to apparatus for the transmission of power, in which are involved relatively shifting toothed members for changing the rate of motion or the direction of motion or the condition from rest to motion, and vice versa, and relates to improved means for guarding against, first, the difficulties of intermeshing the teeth when teeth do not happen to match tooth-spaces; second, the liability of the transmission of heavy work through teeth but partially engaged, and, third, the labor of shifting teeth into engagement while they are under the strain of heavy duty.

The invention will be readily understood from the following description, taken in connection with the accompanying drawings, in which—

Figure 1 is a front elevation of an apparatus embodying my invention, and Fig. 2 is a side elevation of the portion of the driving-pulley in conjunction with the auxiliary friction driving-arm.

In the drawings, 1 indicates housing parts; 2, the driving-shaft; 3, the driven shaft; 4, a gear fast on the driven shaft; 5, a second but larger gear fast on the driven shaft; 6, a pair of gears fast with each other and splined on the driving-shaft; 7, a shifter engaging the pair of splined gears and adapted to slide them so that its component gears may mesh with either of the mating gears, respectively, on the driving-shaft; 8, a friction-clutch pulley, (conventionally shown,) which may be of any desired or suitable ordinary construction; 9, an endwise-movable bar to serve in engaging and disengaging the clutch; 10, an arm fast on the driving-shaft in position to have its outer end sweep around within the rim of the pulley of the friction-clutch; 11, an inward projection, of which there may be a plurality, inwardly from the rim of the pulley, and 12 a yielding friction member on the outer end of the arm in the form of a spring-pad to yieldingly engage the projection 11.

The length of the arm should be such that, assuming the driving-shaft to be at rest, the pulley-rim will pass the end of the arm idly or with clearance until the projection 11 reaches the end of the arm, at which time the projection frictionally engages the arm and lightly drags the arm with it, thus giving rotation to the driving-shaft. The spring-pad is merely an expedient for providing a reasonable degree of elasticity at the points of frictional contact. In the illustrations the projection 11 is inward from the pulley-rim to engage the outer extremity of the arm; but it is manifest that such relative position of the parts is not essential to the accomplishment of the desired result, which is that the driving member (represented in the illustrations by the friction-clutch pulley) shall be normally free of the driving-shaft until the rotation of the driving member brings some part upon it into frictional engagement with some part carried by the driving-shaft. Now, to follow up the ultimate result of this intermittent friction driving device, assume the friction-clutch released and the pulley thereof turning loosely on the driving-shaft, which latter, together with its gears 6, is consequently at rest. If an attempt be made to shift the gears 6 into engagement with one of the mating gears and if that attempt result in failure by reason of tooth ends clashing with tooth ends, as is quite apt to occur, the moving projection 11 will soon engage the end of the arm and turn the driving-shaft and its gears sufficiently to permit teeth to enter tooth-spaces, and as soon as this is done the weak driving power exerted upon the arm will be insufficient to impart motion to the driven shaft, the consequence being that the projection on the pulley slips past the end of the arm and the sliding gear comes to rest with its teeth initially engaged with the teeth of the mating gear. Under these conditions and while there is no strain on the teeth the gear may be slid into complete engagement. Simple and efficient means is thus provided for permitting the certain and safe and easy engagement of the teeth, it being understood that the friction-clutch will be engaged and the full power thrown on only after the complete engagement has been effected. The defects and difficulties which have been referred to as incident to ordinary constructions of transmission devices employing shiftable teeth are well recognized as generally existing in all manner of transmission devices in which are involved a pair of toothed members to be thrown into and out of engagement with each other, and the present invention is applicable to most any transmission system employing such system of toothed members. The shifter and the clutch-operating bar may be actuated by any usual or suitable means, so as to bring about in the usual manner the locking of the clutch-pulley to and its unlocking from its shaft.

I claim—

1. A transmission device comprising a pair of toothed members, means for shifting one of said members into and out of engagement with the other, a rotary driving part for transmitting motion to the toothed members, means for connecting and disconnecting said rotary transmitting part to and from one of the toothed members, and a periodically-acting friction device between the rotary transmitting part and the toothed member to which it is connected, combined substantially as set forth.

2. A transmission device comprising a driving-shaft, a rotary driving part loose thereon, a clutch for locking the driving part to the shaft, and projections carried by the shaft and rotary driving part and adapted for periodical frictional engagement as the rotary driving part turns relative to the shaft, combined substantially as set forth.

3. A transmission device comprising a driving-shaft, a pulley loose thereon, a clutch for locking the pulley to the shaft, a projection carried by the pulley, and an arm carried by the driving-shaft and adapted to be periodically engaged by the projection of the pulley, combined substantially as set forth.

WILLARD THOMAS SEARS.

Witnesses:
ARCHIBALD M. O'BRIEN,
SAMUEL C. KANE.